(12) United States Patent
Goodman

(10) Patent No.: US 8,827,607 B1
(45) Date of Patent: Sep. 9, 2014

(54) MICROMETER CASE TRIMMER

(71) Applicant: Larry Goodman, Cerritos, CA (US)

(72) Inventor: Larry Goodman, Cerritos, CA (US)

( * ) Notice: Subject to any disclaimer, the term of this patent is extended or adjusted under 35 U.S.C. 154(b) by 0 days.

(21) Appl. No.: 14/067,531

(22) Filed: Oct. 30, 2013

(51) Int. Cl.
  *B23B 5/16* (2006.01)
  *F42B 33/10* (2006.01)

(52) U.S. Cl.
  CPC ............... *F42B 33/10* (2013.01); *B23B 5/168* (2013.01)
  USPC .............. 409/131; 86/19.7; 86/24; 82/113; 82/128; 409/138; 409/206; 408/202

(58) Field of Classification Search
  CPC ............ B23B 5/16; B23B 5/168; F42B 33/10
  USPC ................. 409/131, 138–140, 206, 210, 214; 86/19.7, 24; 82/113, 128; 408/202, 408/72 R, 84, 97, 110
  See application file for complete search history.

(56) References Cited

U.S. PATENT DOCUMENTS

| | | | | | |
|---|---|---|---|---|---|
| 433,615 | A | * | 8/1890 | Brown | 408/194 |
| 3,174,390 | A | * | 3/1965 | Jacobsen | 86/24 |
| 3,199,168 | A | * | 8/1965 | Rhine | 86/19.7 |
| 3,234,974 | A | * | 2/1966 | Ray | 142/32 |
| 3,274,661 | A | * | 9/1966 | Westbrook | 86/19.7 |
| 3,818,563 | A | * | 6/1974 | Beaulieu | 86/19.7 |
| 4,742,606 | A | * | 5/1988 | Burby et al. | 86/19.7 |
| 4,813,827 | A | * | 3/1989 | Dugger | 408/211 |
| 5,309,813 | A | * | 5/1994 | Henley | 86/23 |
| 5,758,996 | A | * | 6/1998 | Loudon | 408/72 B |
| 6,101,915 | A | * | 8/2000 | Sinclair | 86/24 |
| 6,484,616 | B1 | * | 11/2002 | Giraud | 86/19.7 |
| 8,408,112 | B2 | * | 4/2013 | Keska | 86/24 |

* cited by examiner

*Primary Examiner* — Daniel Howell
(74) *Attorney, Agent, or Firm* — Kenneth L. Green

(57) ABSTRACT

An electric case trimmer assembly utilizes an inexpensive case adapter bearing to adapt for each size case. The case trimmer assembly includes an end mill for cutting excess material from the case. The end mill is fixed to a micrometer dial threadedly engaging a barrel. The case adapter bearing is fixed to the barrel. The micrometer dial is rotated to adjust the position of the end mill with respect to the case adapter bearing to precisely adjust the amount of material cut from the case. The case adapter bearing is easily changed to trim different cases.

9 Claims, 4 Drawing Sheets

MICROMETER CASE TRIMMER

BACKGROUND OF THE INVENTION

The present invention relates to trimming ammunition cases and in particular to a motorized adjustable precision micrometer case trimmer.

Ammunition cases are generally the most expensive component of ammunition. Many shooting enthusiasts reuse the cases to save money. While such cases may be capable of multiple uses, some cases, especially expensive high power rifle cases, are stretched in each use. When the cases are stretched, the neck of the case (the portion a bullet is seated in), becomes longer and increases the contact surface with bullet, and affects the release of the bullet when the ammunition is filed. Such changes in the release affect the velocity, and thus the consistency of the bullet at long range.

To address the case stretching, the cases are often trimmed back to the original length. Both manual and electric trimmers are known. Unfortunately, the known electric trimmers require expensive separate components for each size case.

BRIEF SUMMARY OF THE INVENTION

The present invention addresses the above and other needs by providing an electric case trimmer assembly which utilizes an inexpensive case adapter bearing to adapt for each size case. The case trimmer assembly includes an end mill for cutting excess material from the case. The end mill is fixed to a micrometer dial threadedly engaging a barrel. The case adapter bearing is fixed to the barrel. The micrometer dial is rotated to adjust the position of the end mill with respect to the case adapter bearing to precisely adjust the amount of material cut from the case. The case adapter bearing is easily changed to trim different cases.

In accordance with one aspect of the invention, there is provided an electric case trimmer assembly having a micrometer cutting adjustment. A first cut is made intentionally leaving the case longer than intended. The case is measured, and the micrometer dial is turned a pre-determined number of lines to precisely adjust the case trimmer to trim the case to the correct length.

In accordance with another aspect of the invention, there is provided a method according to the present invention. The method includes installing a case adapter bearing for a selected case type into a barrel of the case trimmer assembly, turning a micrometer dial of the case trimmer assembly counter clockwise until a stop is reached, turning the micrometer dial of the case trimmer assembly clockwise to align a micrometer dial mark with a first barrel mark, attaching the case trimmer assembly to a drill motor, with the drill motor running, inserting a case of the selected case type into the case trimmer assembly against an end mill of the case trimmer assembly, trimming excess material from the case, removing the trimmed case from the case trimmer assembly, measuring the length of the trimmed case, turning the micrometer dial clockwise to adjust the position of the end mill with respect to the case adapter bearing, with the drill motor running, inserting a case of the selected case type into the case trimmer assembly, and trimming excess material from the case.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
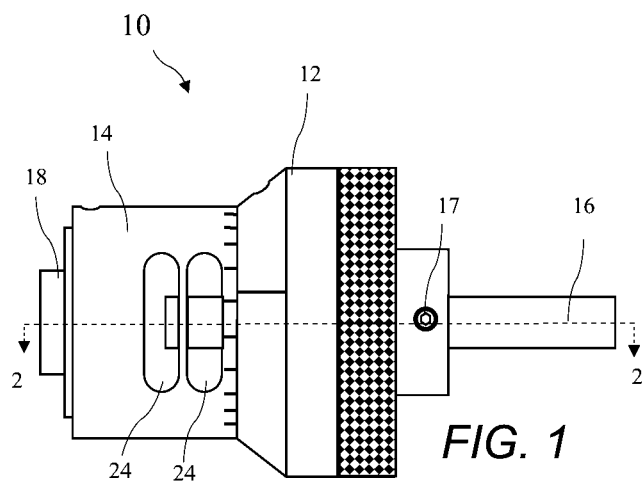
FIG. 1 is a side view of a case trimming assembly according to the present invention.
Figure 2:
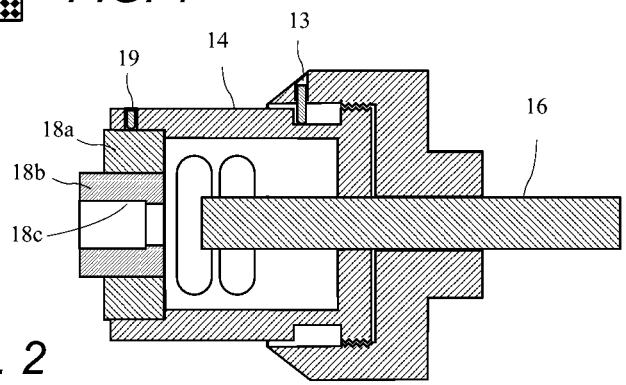
FIG. 2 is a cross-sectional view of the case trimming assembly according to the present invention taken along line 2-2 of FIG. 1.
Figure 3:
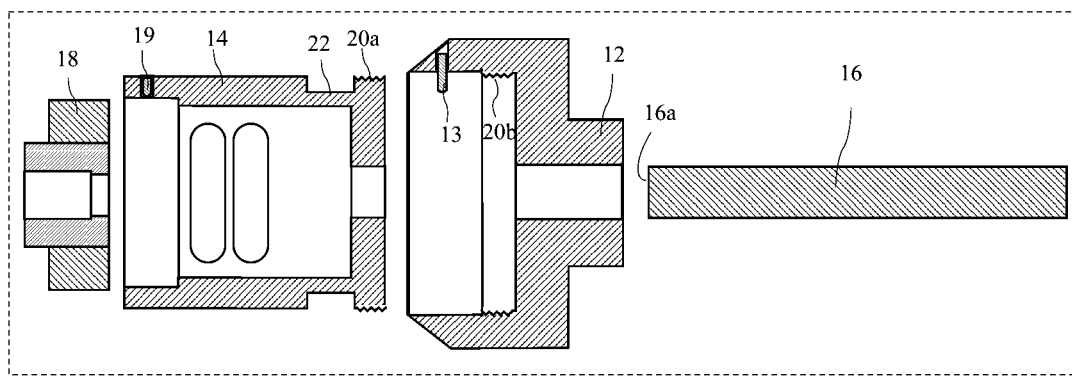
FIG. 3 is a cross-sectional view of the case trimming assembly according to the present invention separated into major components taken along line 2-2 of FIG. 1.

A side view of a case trimming assembly 10 according to the present invention is shown in FIG. 1, a cross-sectional view of the case trimming assembly 10 taken along line 2-2 of FIG. 1 is shown in FIG. 2, and a cross-sectional view of the case trimming assembly 10 separated into major components taken along line 2-2 of FIG. 1 is shown in FIG. 3. The case trimming assembly 10 includes a micrometer dial 12 (or end mill holding portion), a barrel 14 (or case guiding portion), a case adapter bearing 18, and an end mill 16. The end mill 16 is fixedly attached to the micrometer dial 12 using a set screw 17 and the case adapter bearing 18 is fixedly attached to the barrel 14 by a set screw 19. The end mill 16 includes a cutting face 16a for trimming cases. The end mill 16 and case adapter bearing are coaxial with the micrometer dial 12.

The barrel 14 threadedly engages the micrometer dial 12 by threads 20a and 20b, and a third set screw 13 engages a notched ring 22 of the barrel 14. The end mill 16 is fixedly attached to the micrometer dial 12 and turning the micrometer dial 12 on the barrel 16 advances and retreats the end mill 16 with respect to the barrel 14. The case adapter bearing 18 includes an outer race 18a fixedly attached to the barrel by the set screw 19 and a rotating inner race 18b having an inner case contour 18c. The inner case contour 18c is configured for one or more cases 30 (see FIG. 4) and limits the distance a case 30 can be inserted into the barrel 14. The set screw 13 serves two purposes. The set screw 13 is tightened against the barrel 14 to fix the position of the micrometer dial for repeated trimming, and during adjustment, the set screw 13 contacts sides of the notched ring 22 to limit adjustment of the micrometer ring 12 on the barrel 14.

Figure 4:
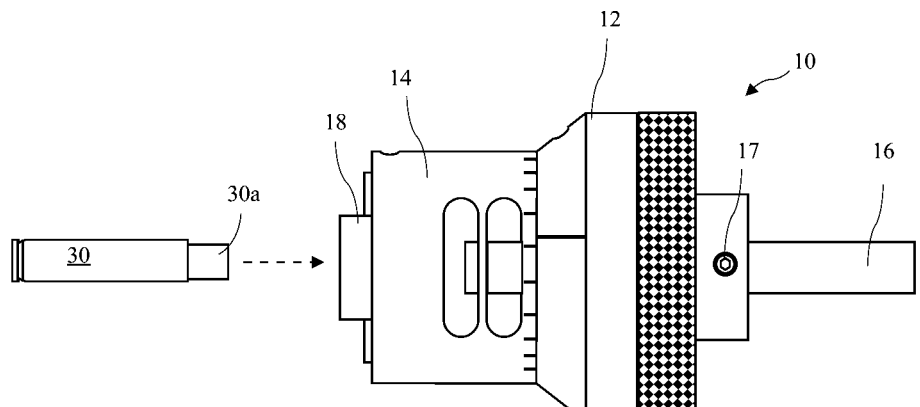
FIG. 4 is a side view of the case trimming assembly according to the present invention with a case ready for insertion into the case trimming assembly.
Figure 5:
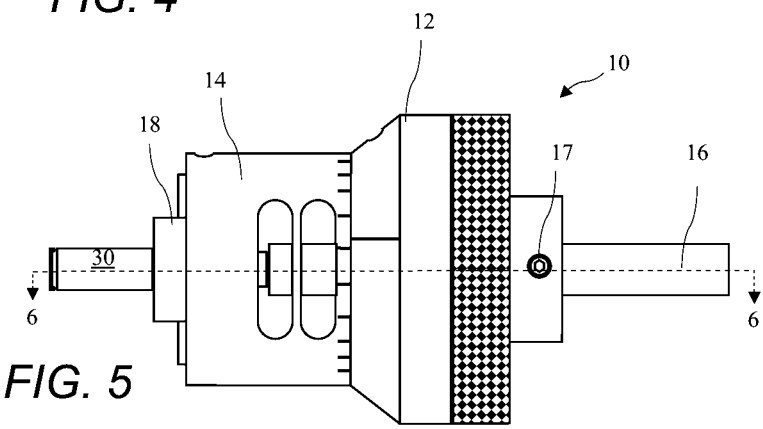
FIG. 5 is a side view of the case trimming assembly according to the present invention with the case in the case trimming assembly.
Figure 6:
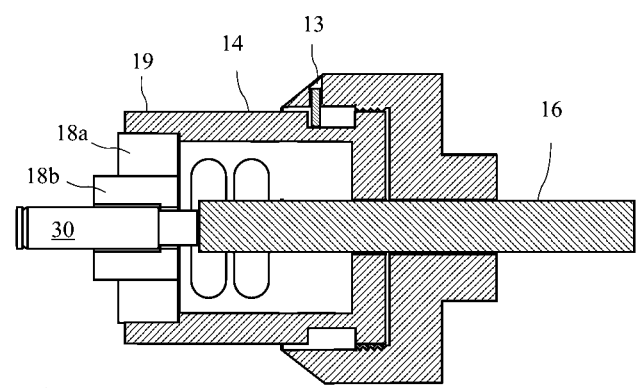
FIG. 6 is a cross-sectional view of the case trimming assembly according to the present invention with the case in the case trimming assembly taken along line 6-6 of FIG. 5.

A side view of the case trimming assembly 10 with a case 30 ready for insertion into the case trimming assembly 10 is shown in FIG. 4, a side view of the case trimming assembly 10 with the case 30 in the case trimming assembly 10 is shown in FIG. 5, and a cross-sectional view of the case trimming assembly 10 with the case 30 in the case trimming assembly 10 taken along line 6-6 of FIG. 5 is shown in FIG. 6. Windows 24 allow viewing the contact of case 30 with the end mill 16 and allows trimmed material to escape from the barrel 14. The case 30 is manually inserted by a user until the case 30 rests against the inner case contour 18c of the case adapter bearing 18. When the case mouth 30a encounters the end mill cutting face 16a before the case 30 is seated against the inner case contour 18c, material is cut from the case mouth 30a until further advance of the case 30 into the barrel is stopped by the inner case contour 18c.

Figure 7:
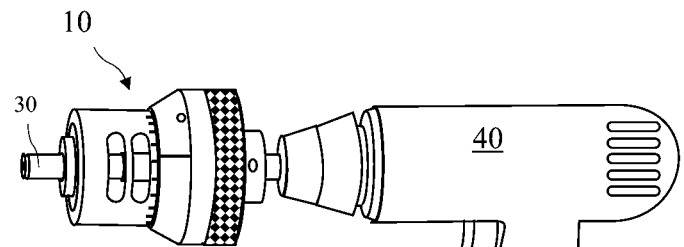
FIG. 7 is a side view of the case trimming assembly according to the present invention attached to a drill motor.

A side view of the case trimming assembly 10 attached to a drill motor 40 is shown in FIG. 7. The entire case trimming assembly 10, with only the exception of the rotating inner race 18b of the case adapter bearing 18, is rotated by the drill motor 40. The user holds the case 30 and inserts the case 30 into the rotating case trimming assembly 10.

Figure 8A:
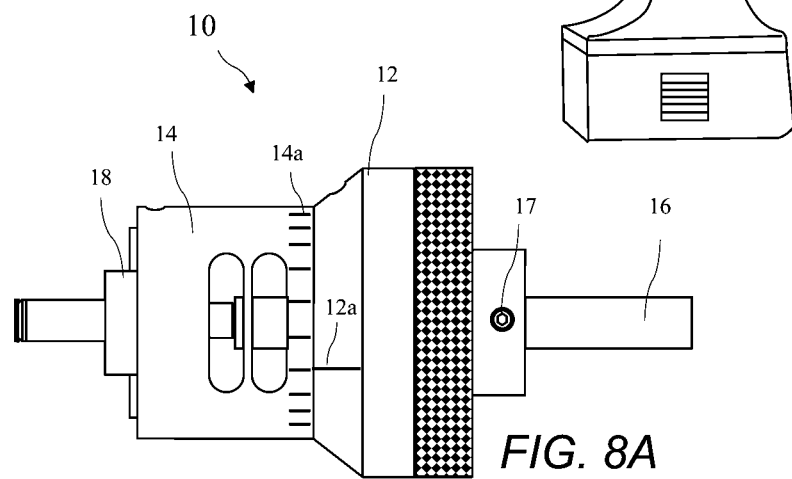
FIG. 8A is a side view of the case trimming assembly according to the present invention with the case in the case trimming assembly for a first cut before precision adjustment.
Figure 8B:
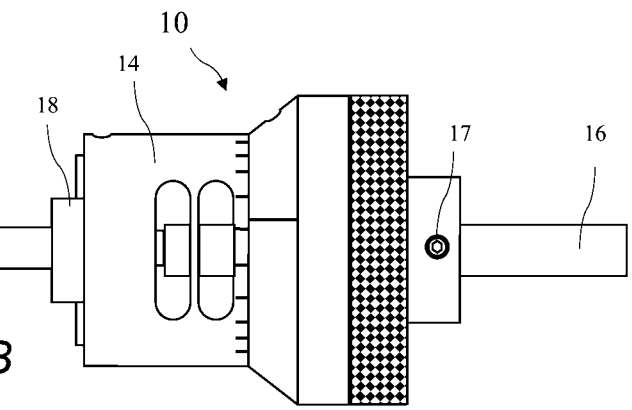
FIG. 8B is a side view of the case trimming assembly according to the present invention with the case in the case trimming assembly for second and latter cuts after precision adjustment.

A side view of the case trimming assembly 10 with the case 10 in the case trimming assembly 10 for a first cut before precision adjustment is shown in FIG. 8A and a side view of the case trimming assembly 10 with the case 30 in the case trimming assembly 10 for second and later cuts after precision adjustment is shown in FIG. 8B. The first cut is made with the micrometer dial turned counter clockwise as far as possible, but turned back clockwise to align a dial mark 12a with a closest barrel mark 14a. There is preferably a single dial mark 12a and preferably a multiplicity of evenly spaced apart barrel marks 14a. The number of barrel marks may vary, but a relationship between the angular spacing of the barrel marks 14a and the threads 20a and 20b (see FIG. 3) is preferably known and used as a basis for adjusting the micrometer dial 12 on the barrel 14. For example, in a preferred embodiment, turning the micrometer dial 12 to align the dial mark 12a with and adjacent barrel mark 14a, advances or retreats the micrometer dial 12 0.002 inches on the barrel 14.

After making a first cut, the length of the trimmed case 30 is measured, and the micrometer dial is adjusted on the barrel to provide the desired precision cut.

Figure 9:
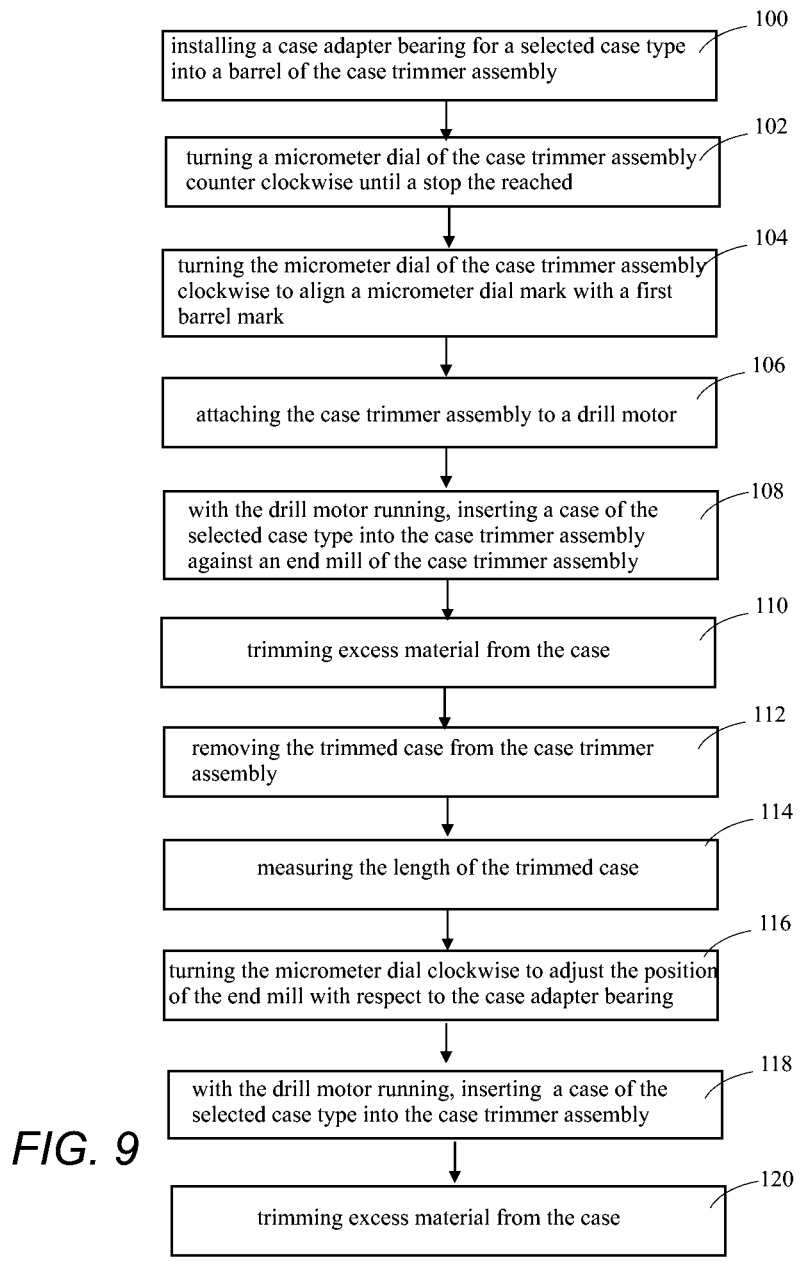
FIG. 9 is a method according to the present invention.

FIG. 9 is a method according to the present invention. The method includes installing a case adapter bearing for a selected case type into a barrel of the case trimmer assembly at step 100, turning a micrometer dial of the case trimmer assembly counter clockwise until a stop is reached at step 102, turning the micrometer dial of the case trimmer assembly clockwise to align a micrometer dial mark with a first barrel mark at step 104, attaching the case trimmer assembly to a drill motor at step 106, with the drill motor running, inserting a case of the selected case type into the case trimmer assembly against an end mill of the case trimmer assembly at step 108, trimming excess material from the case at step 110, removing the trimmed case from the case trimmer assembly at step 112, measuring the length of the trimmed case at step 114, turning the micrometer dial clockwise to adjust the position of the end mill with respect to the case adapter bearing at step 116, with the drill motor running, inserting a case of the selected case type into the case trimmer assembly at step 118, and trimming excess material from the case at step 120.

While the invention herein disclosed has been described by means of specific embodiments and applications thereof, numerous modifications and variations could be made thereto by those skilled in the art without departing from the scope of the invention set forth in the claims.

I claim:

1. A case trimmer comprising:
an end mill holding portion;
an end mill fixedly attached to the end mill holding portion;
a case guiding portion adjustably cooperating with the end mill holding portion to adjust a separation of a case inserted into the case guiding portion from a cutting face of the end mill;
a removable and replaceable case adapter attached to the case guiding portion, the case adapter including an inner case contour configured to limit insertion of the case into the case guiding portion, and aligned to present a case mouth of the case inserted into the inner case contour, to the cutting face of the end mill to trim the case,
wherein:
the case adapter is a case adapter bearing;
an outer race of the case adapter bearing is fixedly attachable to the case guiding portion; and
the inner case contour is an inner surface of an inner race of the case adapter bearing.

2. The case trimmer of claim 1, wherein: the adjustable cooperation of the end mill holding portion with the case guiding portion comprises threaded cooperation of the end mill holding portion with the case guiding portion and rotating the case guiding portion with respect to the case guiding portion adjusts the separation of the inner case contour from the cutting face of the end mill.

3. The case trimmer of claim 2, wherein cooperating angular position indicia is present on the case guiding portion and on the end mill holding portion to show a user how much the separation of the inner case contour from the cutting face of the end mill is changed when the case guiding portion is rotated with respect to the case guiding portion.

4. The case trimmer of claim 2, wherein:
the case guiding portion includes a notched ring on an exterior of the case guiding portion;
the end mill holding portion overlaps the notched ring;
a radially aligned set screw threadedly engages the end mill holding portion and reached into the notched ring; and
the set screw limits the adjustment of the separation of the inner case contour from the cutting face of the end mill and fixes the separation of the inner case contour from the cutting face of the end mill when tightened against the case guiding portion.

5. The case trimmer of claim 1, wherein separate case adapter portion are provided for difference shaped cases.

6. A case trimmer comprising:
a micrometer dial;
an end mill fixedly attachable to and detachable from the micrometer dial;
a case adapter bearing having an inner race including an inner case contour configured to limit the advance of a case into the case adapter bearing, wherein different case adapter bearings are provided for difference shaped cases;
a barrel, the case adapter bearing fixedly attachable to the barrel and detachable from the barrel, the barrel threadedly cooperating with the micrometer dial to adjust a separation of the inner case contour of the case adapter bearing from a cutting face of the end mill;
a notched circumferential ring on an exterior of the barrel, wherein:
the micrometer dial overlaps the notched circumferential ring;

a radially aligned set screw threadedly engages the micrometer dial reached into the notched circumferential ring; and the set screw limits the adjustment of the separation of the inner case contour from the cutting face of the end mill and fixes the separation of the inner case contour from the cutting face of the end mill when tightened against the barrel; and a multiplicity of uniformly angularly spaced apart barrel marks on the barrel and dial mark on the micrometer dial proximal to the barrel marks, the angular spacing of the barrel marks corresponding to a change in the separation of the inner case contour of the case adapter bearing from a cutting face of the end mill.

7. A method for trimming a case, the method comprising:

setting a case trimmer assembly to make a first cut;

attaching the case trimmer assembly to a drill motor;

with the drill motor running, inserting a case of a selected case type into a case adapter bearing of the case trimmer assembly against an end mill of the case trimmer assembly;

trimming excess material from the case to produce a trimmed case;

removing the trimmed case from the case trimmer assembly;

measuring a length of the trimmed case;

turning a micrometer dial of the case trimmer assembly clockwise to adjust a position of the end mill with respect to the case adapter bearing, with the drill motor running, inserting a second case of the selected case type into the case adapter bearing of the case trimmer assembly; and trimming excess material from the second case.

8. The method of claim 7, further including installing a case adapter bearing for a selected case type into a barrel of the case trimmer assembly before using the case trimmer.

9. The method of claim 7, wherein setting the case trimmer assembly to make a first cut comprises;

turning a micrometer dial of the case trimmer assembly counter clockwise until a stop is reached; and turning the micrometer dial of the case trimmer assembly clockwise to align a micrometer dial mark with a first barrel mark.

* * * * *